United States Patent
Corattiyil et al.

(10) Patent No.: US 7,836,675 B2
(45) Date of Patent: Nov. 23, 2010

(54) SUPERCORE SUMP VENT PRESSURE CONTROL

(75) Inventors: Bala Corattiyil, Montgomery, OH (US); Stephen Eugene Melton, West Chester, OH (US)

(73) Assignee: General Electric Company, Schenectady, NY (US)

( * ) Notice: Subject to any disclaimer, the term of this patent is extended or adjusted under 35 U.S.C. 154(b) by 872 days.

(21) Appl. No.: 11/358,252

(22) Filed: Feb. 21, 2006

(65) Prior Publication Data

US 2007/0193276 A1    Aug. 23, 2007

(51) Int. Cl.
*F02C 7/06* (2006.01)

(52) U.S. Cl. ..................... 60/39.08; 184/6.11

(58) Field of Classification Search ............. 60/39.08; 184/6.11, 6.12; 415/110, 111; 55/438
See application file for complete search history.

(56) References Cited

U.S. PATENT DOCUMENTS

| | | | |
|---|---|---|---|
| 2,672,010 A * | 3/1954 | Newcomb | 60/39.08 |
| 3,378,104 A | 4/1968 | Venable | |
| 3,527,054 A * | 9/1970 | Hemsworth | 60/39.08 |
| 3,722,212 A | 3/1973 | Stein | |
| 3,884,041 A | 5/1975 | Zerlauth | |
| 4,176,651 A * | 12/1979 | Backus | 123/27 GE |
| 4,262,775 A | 4/1981 | Webb | |
| 4,284,174 A * | 8/1981 | Salvana et al. | 184/6.4 |
| 4,433,539 A | 2/1984 | Norris et al. | |
| 4,511,016 A | 4/1985 | Doell | |
| 4,576,001 A | 3/1986 | Smith | |
| 4,888,947 A * | 12/1989 | Thompson | 60/39.08 |
| 4,891,934 A | 1/1990 | Huelster | |
| 5,319,920 A | 6/1994 | Taylor | |
| 5,429,208 A | 7/1995 | Largilliet et al. | |
| 5,611,661 A * | 3/1997 | Jenkinson | 415/112 |
| 6,099,243 A * | 8/2000 | Fiore | 415/111 |
| 6,470,666 B1 | 10/2002 | Przytulski et al. | |
| 6,799,112 B1 * | 9/2004 | Carter et al. | 701/100 |
| 7,093,418 B2 * | 8/2006 | Morris et al. | 60/39.08 |
| 7,426,834 B2 * | 9/2008 | Granitz et al. | 60/772 |
| 2003/0097872 A1 * | 5/2003 | Granitz et al. | 73/116 |

* cited by examiner

*Primary Examiner*—Michael Cuff
*Assistant Examiner*—Phutthiwat Wongwian
(74) *Attorney, Agent, or Firm*—William Scott Andes, Esq.; Armstrong Teasdale LLP

(57) ABSTRACT

An active air pressure control apparatus for a bearing sump cavity in a gas turbine engine includes a bearing assembly supporting a rotatable shaft that connects a rotatable power turbine and a rotatable compressor. The active air pressure control apparatus also includes a sump cavity surrounding the bearing assembly, a sump pressurization cavity in flow communication with a source of pressurized air and in flow communication with the sump cavity, and a sump vent tube in flow communication with the sump cavity and an air/oil separator. The active air pressure control apparatus includes an adjustable valve in the sump vent tube, and a controllable blower in flow communication with the sump vent tube.

10 Claims, 6 Drawing Sheets

SUPERCORE SUMP VENT PRESSURE CONTROL

BACKGROUND OF THE INVENTION

This invention relates generally to gas turbine engines, and, more particularly, to control of air pressure within a bearing oil sump during all operating conditions.

A gas turbine engine typically includes at least one bearing assembly that supports a rotatable shaft. Each bearing assembly is housed within a sump to which lubricating oil is supplied from a supply pump and from which lubricating oil is scavenged and passed through an oil/air separator and a heat exchange system for cleaning and cooling before being returned to the lubricating oil supply system. To control oil leakage from the sump, some gas turbine engines employ bearing sumps housed within pressurized cavities sealed with circumferential labyrinth seals and supplied with air under pressure to minimize oil leakage. Certain aero-derivative gas turbine engines, such as the LMS100, sold by the assignee of this case, require vent sump pressure control to prevent escape of lubricating oil from an oil sump and to prevent oil consumption when operating at high power and corresponding high inlet pressure.

In some prior art gas turbine engines, as shown, for example, in U.S. Pat. No. 6,470,666 B1, issued Oct. 29, 2002 to Przytulski et al. and assigned to the assignee of the present case, a sump evacuation system is employed to lower air pressure inside a sump pressurization cavity to prevent oil leakage during low power or idle operation. As the power levels of gas turbines has been raised, a system to control oil leakage at high power is needed.

BRIEF DESCRIPTION OF THE INVENTION

Method and apparatus for controlling sump pressurization in a gas turbine bearing sump by controllably restricting or actively venting air flow from said sump cavity to maintain a continuous air flow from said sump cavity through a sump vent in all operating conditions.

DETAILED DESCRIPTION OF THE INVENTION

Figure 1:
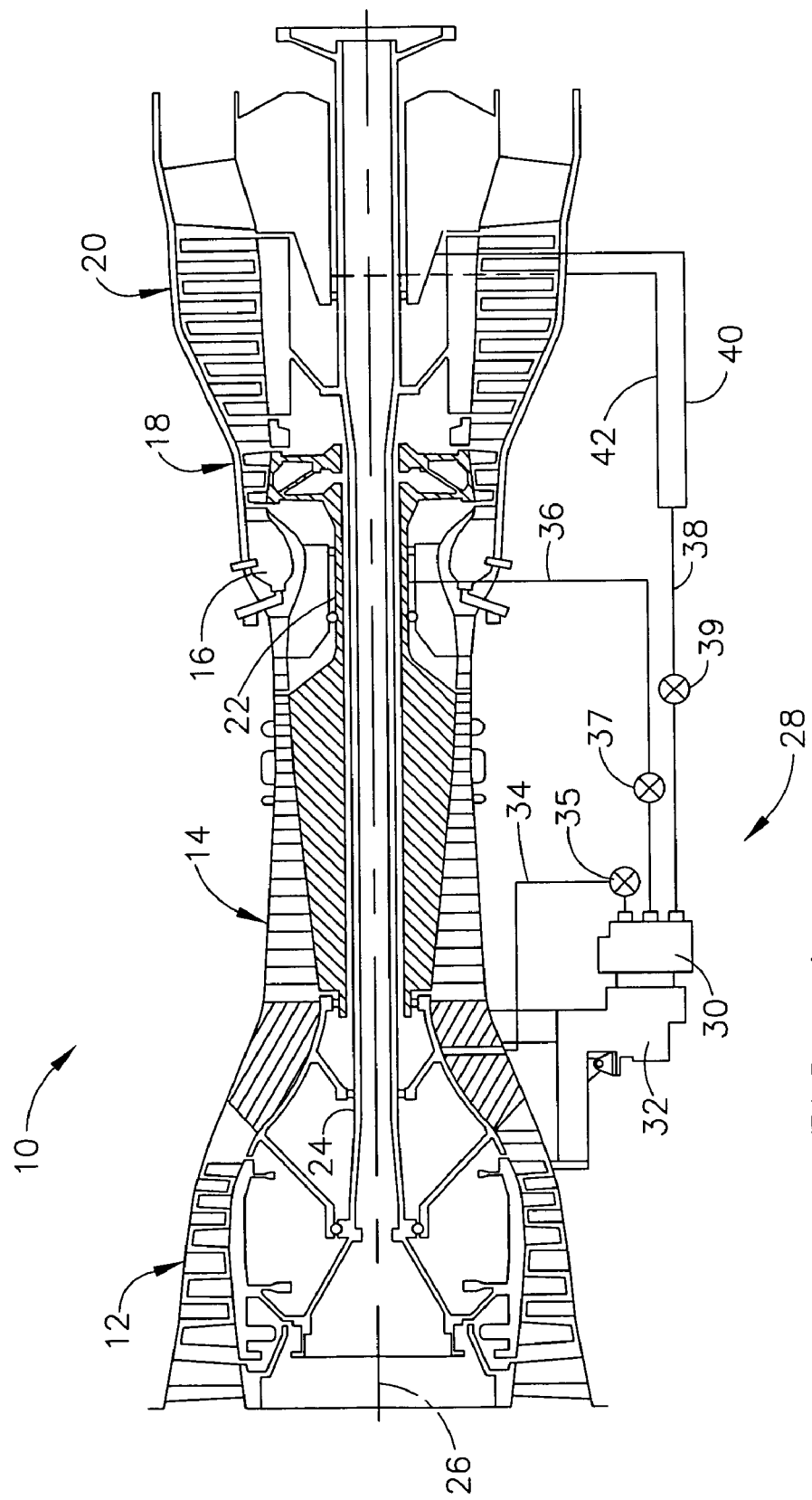
FIG. 1 is a schematic illustration of an exemplary gas turbine engine having a sump evacuation system.

FIG. 1 is a schematic illustration of a gas turbine engine 10, including a low pressure compressor 12, a high pressure compressor 14, a combustor 16, a high pressure turbine 18, and a low pressure turbine 20. Low pressure compressor 12 is connected to low pressure turbine 20 by a first shaft 24, and high pressure compressor 14 is connected to high pressure turbine 18 by a second shaft 22. A plurality of bearing assemblies rotatably support first shaft 24 and second shaft 22 for concentric rotation around longitudinal axis 26. Each bearing assembly is contained within an oil sump. Controlling air pressure within each oil sump aids in maintaining adequate bearing lubrication during all rotational speeds, from sub-idle to maximum power. "Idle" is defined as the lowest rotational operating speed range at which a gas turbine engine operates in a stable mode. For example, "idle" speed for the LMS100 engine is a rotational speed in the range between approximately 6000 and 7000 rpm and in other gas turbine engines may range between about 2500 and 6500 rpm. "Sub-idle" is an engine rotational speed below idle or below the minimum rotational speed at which the engine can sustain stable operation on its own and requires a starter motor to maintain rotation, used for example, for cooling the engine and for engine check out before ignition. Maximum power is the highest speed and highest power output, in the LMS100 approximately 10,400 to 10,600 rpm. Each oil sump is vented via a respective sump vent tube 34, 36 and 38, via air tubes 40 and 42, controlled by respective adjustable valves 35, 37, 39 connecting respective oil sumps to a pressure control system 30 driven by a gear box 32. Each of valves 35, 37 and 39 may be individually activated to a setting appropriate to provide control of air flow through respective sump vent tubes 34, 36 and 38 and minimize oil consumption.

Figure 2:
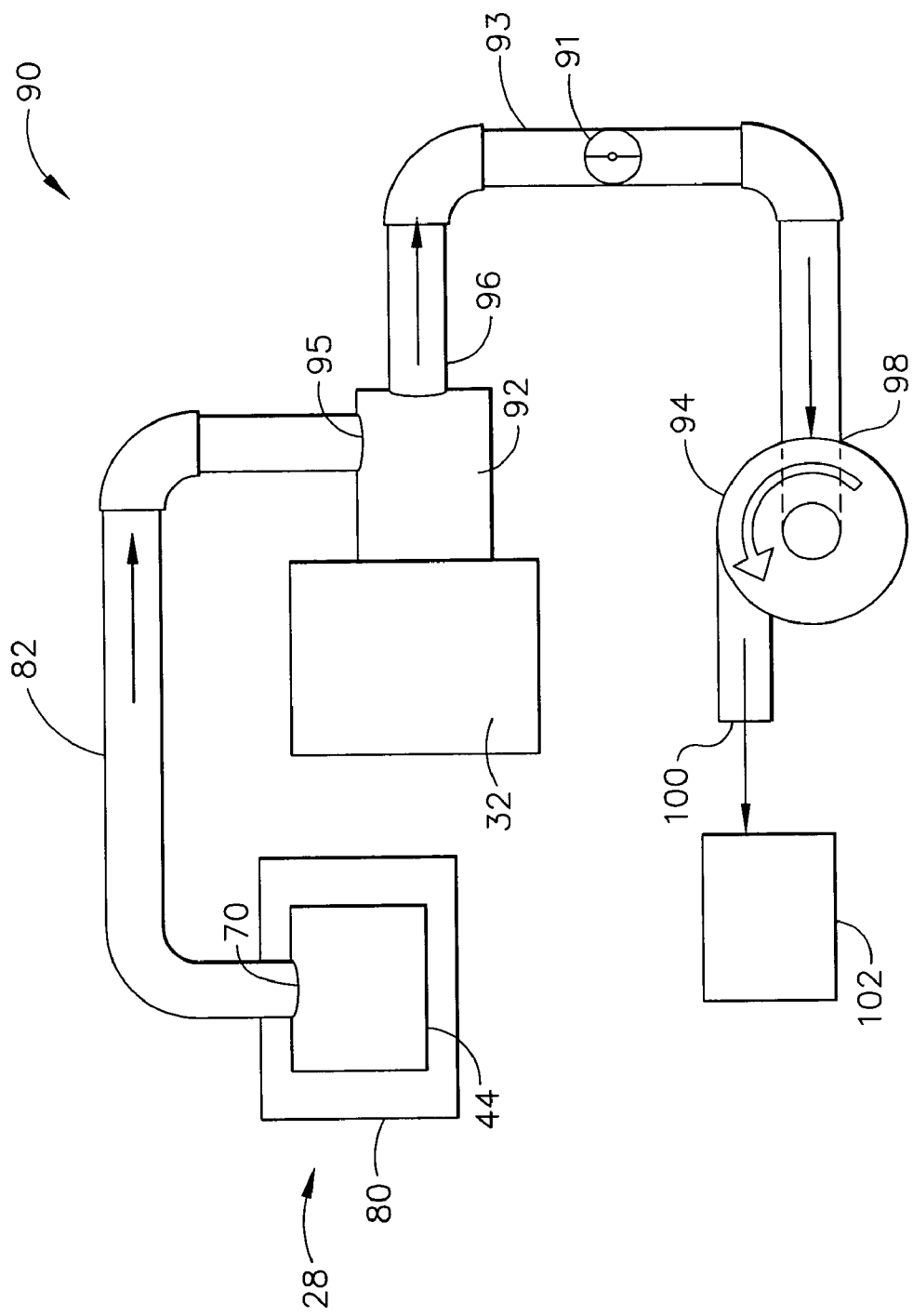
FIG. 2 is a schematic illustration of an exemplary sump evacuation apparatus.

FIG. 2 is a schematic illustration of a sump evacuation system 90 used with lubrication system 28, including a sump oil cavity 44 pressurized by air flow from an oil pressurization cavity 80. Cavity sump vent 70 is connected by vent tube 82 to intake 95 of air/oil separator 92 driven by an accessory drive or gear box 32. Air/oil separator 92 receives a mixture of air and entrained lubricating oil from each sump oil cavity 44. Separator exhaust 96 is coupled to intake 98 of blower 94 via pipe 93 incorporating adjustable valve 91. Blower 94 exhausts air at output 100 to a vent system 102, which may be incorporated into the engine exhaust gas flow. As described in more detail hereinafter, during idle or sub-idle operation, adjustable valve 91 is set to its open position and blower 94 is turned on to maintain a positive pressure on labyrinth seals to minimize oil leakage. During powered operation above idle rotational speed, including maximum power operation, adjustable valve 91 is set to a partially closed position and blower 94 is turned off to allow air flow into the air/oil separator 92 to be driven by pressurized air flow.

Figure 3:
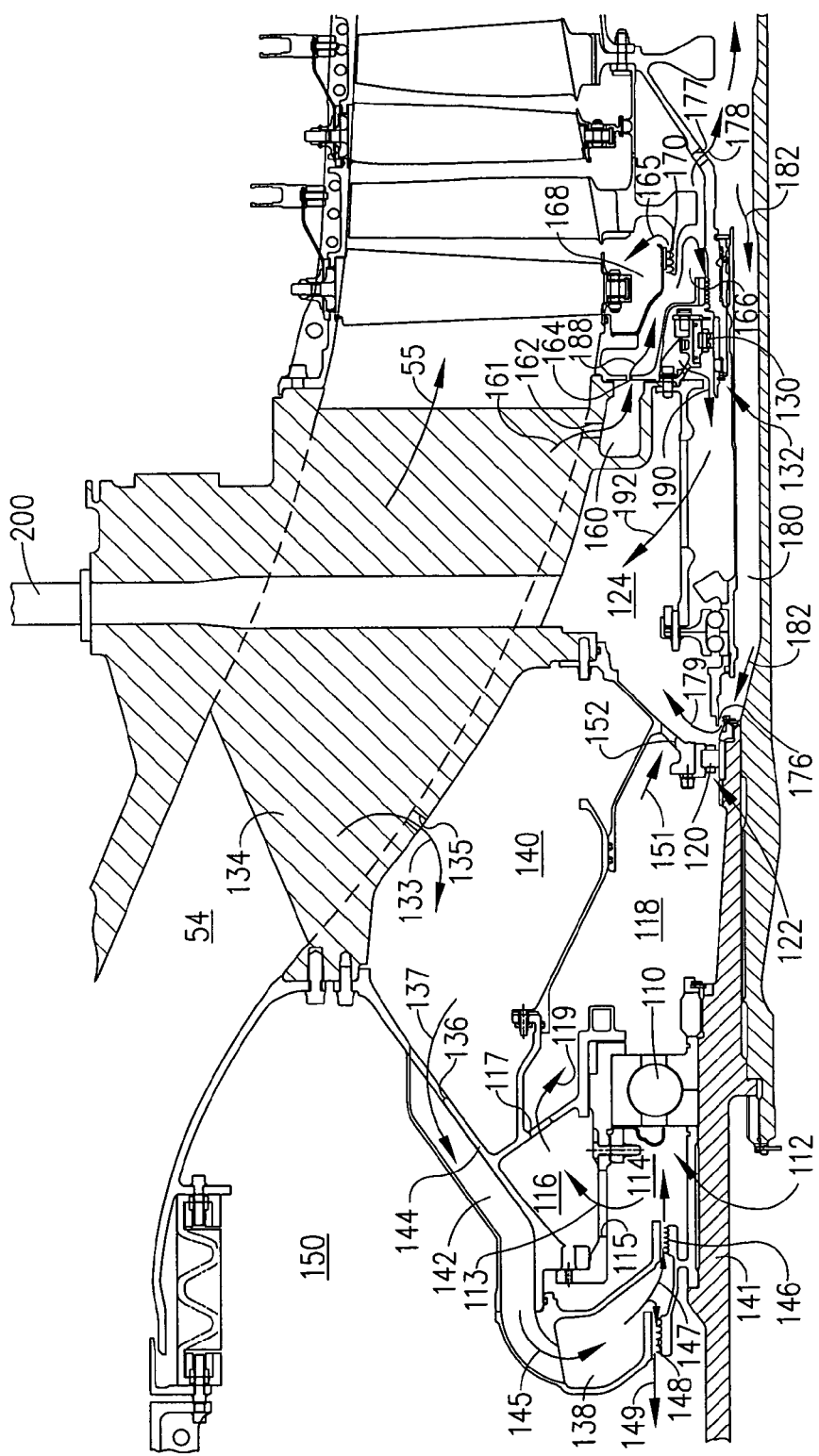
FIG. 3 is a schematic cross-sectional view of an exemplary sump vent pressure control system for a gas turbine engine.
Figure 4:
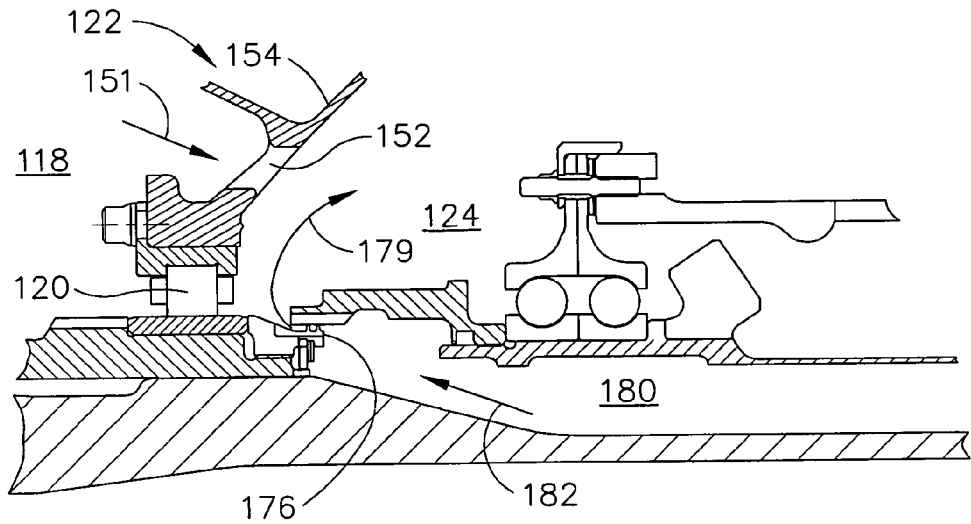
FIG. 4 is a schematic, enlarged, cross-sectional view of one exemplary bearing sump incorporating a vent pressure control system.
Figure 5:
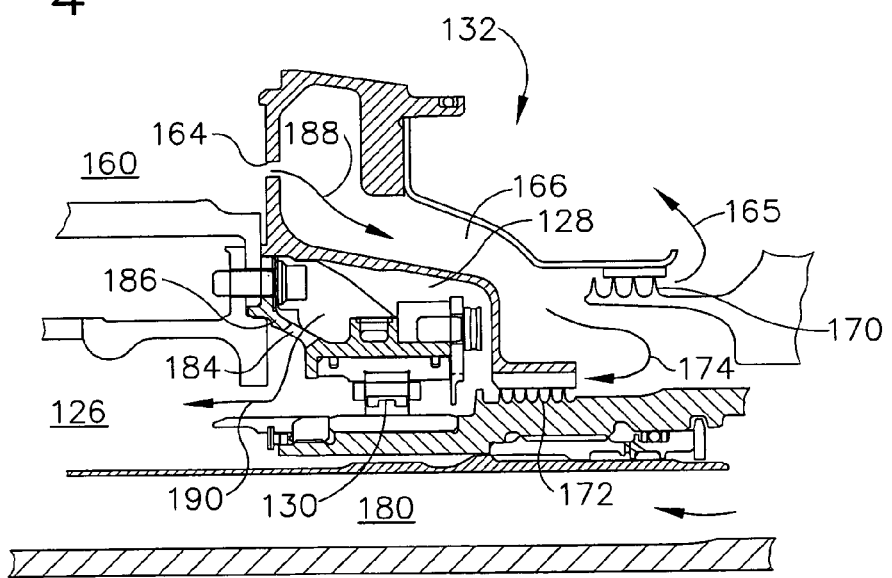
FIG. 5 is a schematic, enlarged, cross-sectional view of a second exemplary bearing sump incorporating a vent pressure control scheme.

FIGS. 3, 4 and 5 schematically illustrate an exemplary bearing assembly sump vent pressure control system. Bearing assemblies 110, 120 and 130 rotatably support rotor shaft 141. Booster output 54 is connected in flow communication through passages within strut 134 and opening 135 with air cavity 140 which is connected through opening 136 and duct 142 to sump pressurization cavity 138. Sump pressurization cavity 138 is in flow communication with a sump cavity chamber 114 via labyrinth seal 146 and is sealed by labyrinth seal 148 to minimize oil consumption by leakage, shown by arrow 149, into engine interior cavity 150 exterior to sump pressurization cavity 138. Bearing assembly 110 is surrounded by a sump cavity 112 comprising sump cavity chamber 114 in flow communication through opening 115 with sump cavity chamber 116 which is also in flow communication through opening 117 with sump cavity chamber 118. Bearing assembly 120 is surrounded by a sump cavity 122 comprising sump cavity chambers 118 and 124 in flow communication through opening 152 through chamber wall 154, as shown enlarged in FIG. 4. Bearing assembly 130 is surrounded by a sump cavity 132, comprising sump cavity chambers 126 and 128 in flow communication through opening 184 through housing wall 186, as shown enlarged in FIG. 5. Booster air flow passages through strut 134 are in flow communication through opening 162 with air cavity 160 and through opening 164 with sump pressurization cavity 166. Sump pressurization cavity 166 is sealed from leakage into engine turbine interior cavity 168 as shown by arrow 165 by labyrinth seal 170 and is connected in flow communication with sump cavity chamber 128 through labyrinth seal 172. Sump pressurization cavity 166 supplies pressurized air as shown by arrow 177 through opening 178 into sump pressurization cavity 180 which directs pressurized air flow to labyrinth seal 176, as shown by arrow 182.

During engine operation above idle, sump cavity 112 is pressurized by compressed air from engine booster output 54 supplied through passages within strut 134 through opening 135, shown by arrow 133, into air cavity 140, and through opening 136, shown by arrow 137, and duct 142 along the sump wall 144 of forward sump cavity chamber 116 and air cavity 140 into sump pressurization cavity 138, as shown by arrow 145. Compressed air flows through labyrinth seal 146, as shown by arrow 147, into sump cavity chamber 114, into sump cavity chamber 116 through opening 115, as shown by arrow 113, and through opening 117 into sump cavity chamber 118, as shown by arrow 119.

Sump cavity 122 is pressurized by the air flow into sump cavity chamber 118 and via opening 152 through chamber wall 154, as shown by arrow 151, into sump cavity chamber 124. Pressurized air flow through sump pressurization cavity 180 as shown by arrow 182 also enters sump cavity chamber 124 through labyrinth seal 176, as shown by arrow 179, as shown in FIG. 4.

Booster air flow, shown by arrow 55, through passages within strut 134 through opening 162 as shown by arrow 161 pressurizes air cavity 160 and through opening 164, as shown by arrow 188, pressurizes sump pressurization cavity 166. Air flow from sump pressurization cavity 166 provides pressurized air to sump cavity chamber 128 through labyrinth seal 172, as shown by arrow 174, as shown in FIG. 5. Sump pressurization cavity 166 supplies pressurized air as shown by arrow 177 through opening 178 via sump pressurization cavity 180 which is connected in flow communication with sump cavity chamber 124 via labyrinth seal 176, as shown by arrow 179, and through opening 184 as shown by arrow 190 into sump cavity chamber 126. Sump cavity chamber 126 is vented to sump cavity chamber 124 as shown by arrow 192.

Air flow from interconnected sump cavities 112 and 122 along the path shown by arrows 113, 119 and 151 into sump cavity chamber 124 and from sump cavity 132 shown by arrow 192 into sump cavity chamber 124 connects the sump cavities 112, 122 and 132 to sump pressure control system through sump vent tube 200 in flow communication with a sump air evacuation system as shown in FIG. 2.

Figure 6:
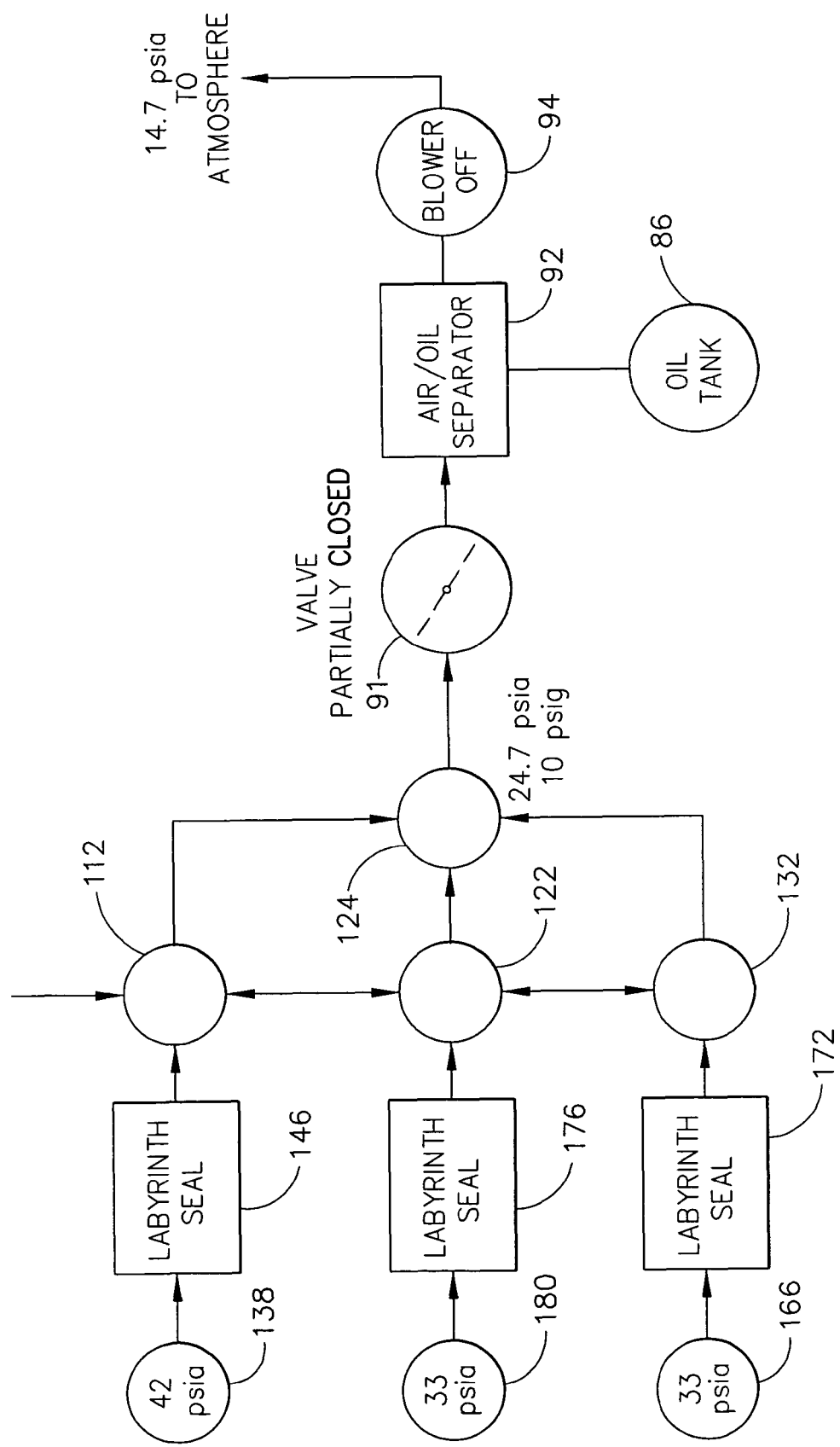
FIG. 6 is a block diagram illustration of a first exemplary operation of a sump vent pressure control system.

FIG. 6 illustrates in block diagram form the active control scheme used to control pressurization of the sump cavities 112, 122, 132 in order to avoid oil consumption, during all above idle rotational speeds. Air pressure provided by air flow from booster 54 raises air pressure within sump pressurization cavities 138, 166 and 180, and will force a mixture of air with entrained oil to flow through sump cavities 112, 122 and 132 to sump cavity chamber 124 and sump vent tube 200 to the air/oil separator 92. Air/oil separator 92 removes oil from the mixture and returns it to oil tank 86 and oil sump cavities 112, 122 and 132. Pressure inside the sump cavities 112, 122, and 132 will typically be between 18 and 24 psia (pounds per square inch absolute) at maximum power driven by air flow through labyrinth seals 146, 176 and 172, which would be pressurized to approximately 42 psia in sump pressurization cavity 138 and 33 psia in sump pressurization cavities 166 and 180, as shown in FIG. 6. These increased air pressures may tend to accelerate air flow through sump cavities 112, 122 and 132 and increase the quantity of entrained oil flowing to air/oil separator 92. Avoiding excessive oil consumption would require a large capacity air/oil separator and oil tank adding significant size and weight to the engine system. To control the air flow to the air/oil separator 92 adjustable valve 91 is set to a partially closed position and blower 94 is turned off. This holds air pressure within sump cavity chamber 124 at approximately 24.7 psi guage and restricts air and oil flow to an quantity which can be readily processed by air/oil separator 92 to remove oil and deposit it into oil tank 86 for recirculation to bearing assemblies 110, 120 and 130.

Figure 7:
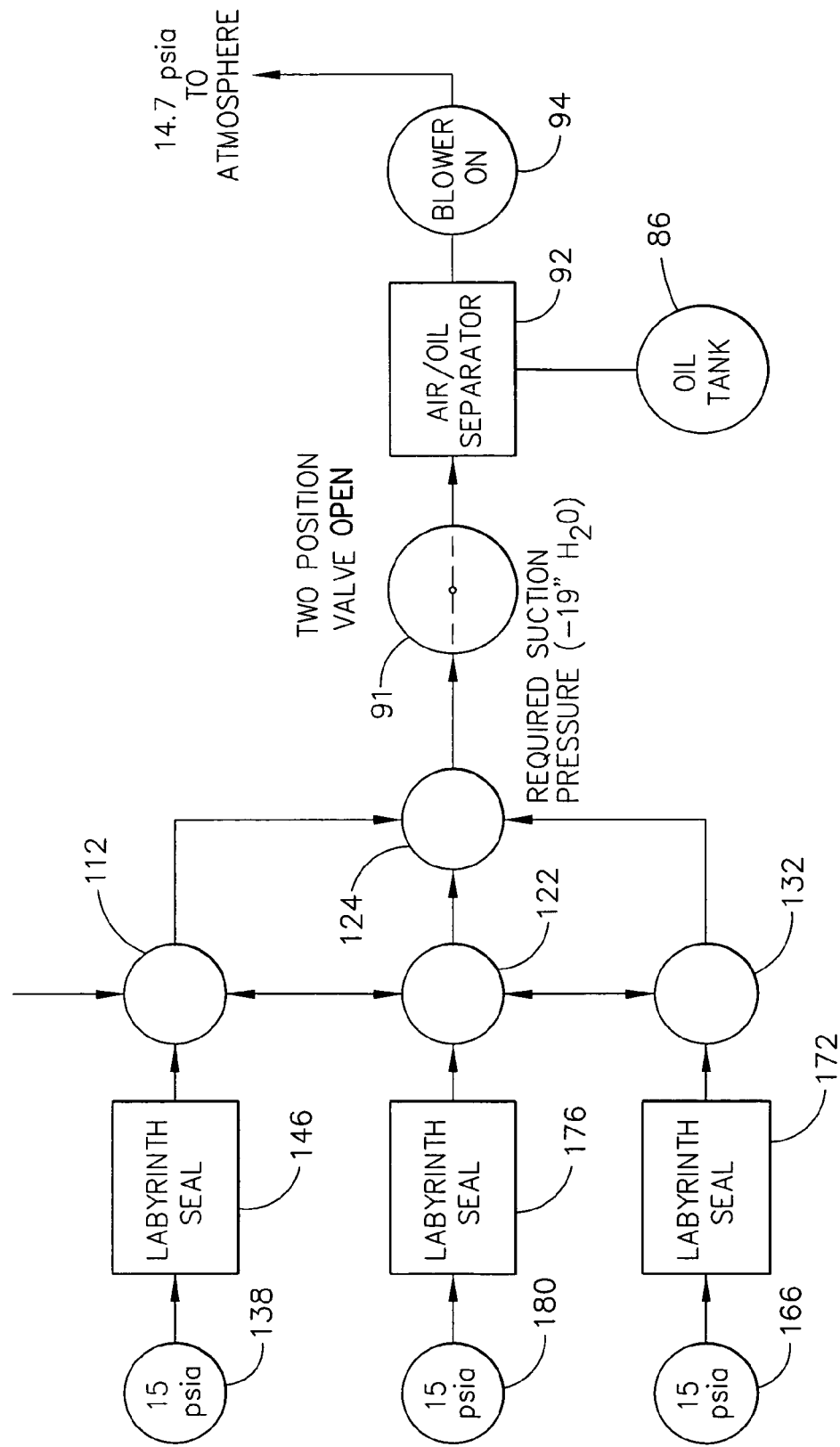
FIG. 7 is a block diagram illustration of a second exemplary operation of a sump vent pressure control system.

FIG. 7 illustrates in block diagram form the active control scheme used to control pressurization of the sump cavities 112, 122, 132 when a gas turbine engine is operating at idle or sub-idle. Air pressure within sump pressurization cavities 138, 166 and 180 is approximately atmospheric pressure as shown and is inadequate to maintain continuous flow from the sump cavities 112, 122, 132 through sump vent tube 200 to air/oil separator 92. In order to maintain minimum necessary air flow through labyrinth seals 146, 176 and 172, in idle or sub-idle operation adjustable valve 91 is set to a fully open position and blower 94 is turned on. Blower 94 draws air flow through the vent tube to lower pressure inside the sump cavities 112, 122, and 132 to approximately 14.0 psi. and draw an air-oil mixture to the air/oil separator 92 which removes the oil from the mixture which is returned to the oil sump cavities 112, 122 and 132 through oil tank 86.

FIGS. 3, 6 and 7 illustrate schematically a system having three sump cavities 112, 122, and 132, but it is to be understood that the oil sump pressurization system described can be employed to control pressurization of a single sump cavity surrounding a single bearing assembly or a large number of bearing assemblies, or can be used with a plurality of separate vent tubes including a separately controlled valves connected individually to separate bearing assemblies, so that each may be individually controlled. FIG. 1 illustrates an sump lubrication system in which air flow through sump vent tubes 34, 36 and 38 is separately controlled by respective adjustable valves 35, 37 and 39. Each of adjustable valves 35, 37 and 39 may be set to a unique setting to restrict flow in each respective sump vent tube 34, 36 and 38 at a separate flow rate from the other flow tubes to allow a predetermined air flow through the respective sump vent tubes 34, 36 and 38 to maintain oil/air flow into the air/oil separator during all operating conditions. Certain operating conditions may require that one of the adjustable valves 35, 37 or 39 be set to a restricted flow setting with the blower turned off, while allowing another adjustable valve to be set at its fully open position with its blower turned on. The flexibility of pressure control provided by the controllable blower and valve combination to each bearing assembly or combination of bearing assemblies offers maximum protection to the bearing assembly lubrication system.

While the invention has been described in terms of various specific embodiments, those skilled in the art will recognize that the invention can be practiced with modification within the spirit and scope of the claims.

What is claimed is:

1. Active air pressure control apparatus for a bearing sump cavity in a gas turbine engine comprising:
   a bearing assembly supporting a rotatable shaft connecting a rotatable power turbine and a rotatable compressor;
   a sump cavity surrounding said bearing assembly;

a sump pressurization cavity in flow communication with a source of pressurized air and in flow communication with said sump cavity via a labyrinth seal configured to minimize oil leakage into an interior cavity of said gas turbine engine;

a sump vent tube in flow communication with said sump cavity and an air/oil separator;

an adjustable valve positioned in said sump vent tube, capable of being set in said adjustable valve selectively positionable to one of a fully open position and a partially closed position; and a controllable blower in flow communication with said sump vent tube, wherein said controllable blower is turned off when the adjustable valve is set in the partially closed position and turned on when the adjustable valve is set to the fully open position.

2. The apparatus of claim 1 further comprising:

a plurality of bearing assemblies for supporting said rotatable shaft;

a plurality of sump cavities each surrounding a respective one of said bearing assemblies in flow communication with said sump vent tube;

a plurality of sump pressurization cavities each in flow communication with a source of pressurized air and each in flow communication with a respective one of said sump cavities.

3. Active air pressure control apparatus for a plurality of bearing sump cavities in a gas turbine engine comprising:

a plurality of bearing assemblies supporting a rotatable shaft connecting a rotatable power turbine and a rotatable compressor;

a plurality of sump cavities each surrounding a respective one of said bearing assemblies;

a plurality of sump pressurization cavities each in flow communication with a source of pressurized air and each in flow communication with a respective one of said sump cavities via a plurality of labyrinth seals configured to minimize oil leakage into an interior cavity of said gas turbine engine;

a plurality of sump vent tubes each in flow communication with a respective one of said sump cavities and an air/oil separator;

an adjustable valve positioned in each said sump vent tube, said adjustable valve selectively positionable to one of a fully open position and a partially closed position; and a controllable blower in flow communication with said sump vent tubes, wherein said controllable blower is turned off when the adjustable valves are set in the partially closed position and turned on when at least one of the adjustable valves is set to the fully open position.

4. The apparatus of claim 1, further comprising a pressure control system for controlling said adjustable valve.

5. The apparatus of claim 4, wherein said pressure control system sets said adjustable valve to the fully open position during idle operation and sub-idle operation of the gas turbine engine.

6. The apparatus of claim 4, wherein said pressure control system sets said adjustable valve to the partially closed position during above-idle operation of the gas turbine engine.

7. The apparatus of claim 4, wherein said pressure control system further controls said controllable blower.

8. The apparatus of claim 3, further comprising a pressure control system for separately controlling said adjustable valves.

9. The apparatus of claim 8, wherein, said pressure control system controls each said adjustable valve to maintain one or more of the following: a predetermined pressure in each said sump cavity and a predetermined air flow through each said sump vent tube.

10. The apparatus of claim 8, further comprising a controllable blower in flow communication with each said sump vent tube, wherein said pressure control system further controls said controllable blowers.

* * * * *